United States Patent

Belk et al.

[15] 3,656,526

[45] Apr. 18, 1972

[54] APPARATUS FOR SEPARATING SEEDS FROM CITRUS FRUIT

[72] Inventors: Wilber C. Belk, Lakeland; Charles T. Mulford, Auburndale, both of Fla.

[73] Assignee: FMC Corporation, San Jose, Calif.

[22] Filed: Sept. 10, 1970

[21] Appl. No.: 70,972

[52] U.S. Cl. .................................................. 146/3 N
[51] Int. Cl. ..................................................... A23n 3/00
[58] Field of Search ............................ 146/3 N, 17 R, 22

[56] References Cited

UNITED STATES PATENTS

2,155,768  4/1939  Polk, Sr. et al. .................. 146/3 N
3,324,912  6/1967  Willis ................................. 146/3 N
3,072,160  1/1963  Grotewold ......................... 146/3 N

Primary Examiner—Willie G. Abercrombie
Attorney—F. W. Anderson, C. E. Tripp and Gary M. Polumbus

[57]  ABSTRACT

Seeds are separated from whole citrus fruit, which has been peeled and is retained in a static position, by inserting around the central core thereof in the region of the fruit seeds a plurality of circumferentially spaced stationary pinching fingers and a plurality of circumferentially spaced oscillating pinching fingers interspaced between the stationary fingers. The oscillating pinching fingers are oscillated in arcuate paths toward and away from the adjacent stationary fingers to pinch the fruits seeds therebetween and thereby separate them from the meat segments of the fruit.

14 Claims, 11 Drawing Figures

FIG_1

INVENTORS
WILBER C. BELK
CHARLES T. MULFORD

APPARATUS FOR SEPARATING SEEDS FROM CITRUS FRUIT

BACKGROUND OF THE INVENTION

1. Field of the Invention

The present invention pertains to apparatus for sectionizing citrus fruit and more particularly concerns an improved apparatus for separating seeds from citrus fruit sections.

2. Description of the Prior Art

The meat or juice-bearing portion of citrus fruit is composed of groups of inter connected juice sacs, each group being in the form of a segmental section which is surrounded by a membrane. The portions of the segment wall, which extend more or less radially from the pithy core of the whole fruit and define the plane faces of the segment, are referred to as radial membranes and intersect at the apex of the segment, while the portion of the segment wall which lies adjacent the peel of the fruit and defines the spherical face of the segment is called the outer membrane.

In the citrus fruit industry, "sectionizing" is an operation by which the naturally shaped, membrane-free meat segments are removed from citrus fruit, particularly grapefruit, and this operation can basically be performed by first peeling the outer skin and albedo from the grapefruit, placing the peeled fruit in a fruit holder, cutting paths in the outer membrane through which cutting blades can be inserted, and finally cutting along the inner surface of the outer and radial membranes to free the meat segments from their surrounding membranes. Frequently, however, the fruit seeds, which are concentrated within the juice sacs at the apex of the segmental sections, remain intact with the meat segments even after the membranes have been removed. These seeds must be removed to improve the quality or grade of the fruit meat segments.

A citrus fruit seed loosener and sectionizer is disclosed in U.S. Pat. No. 3,072,160 issued to H.W. Grothewold on Jan. 8, 1963. This patent discloses a seed loosening system wherein two separate sets of circumferentially spaced blades are sequentially forced into and out of the core of the fruit to contact and loosen the seeds disposed in the blade paths. The two sets of blades are mounted so as to penetrate the fruit in the same circular path but the blades of one set are angularly displaced from the blades of the other set so that seeds not contacted by the first set will be contacted by the second set.

Another seed separating device for use on citrus fruits is disclosed in U.S. Pat. No. 3,324,912 issued to B.N. Willis on June 13, 1967. This patent shows a device similar to that of the aforementioned Grotewold patent but wherein only one set of circumferentially spaced blades are forced into the fruit. The blades in the Willis device are rapidly oscillated arcuately within the fruit to break the seeds loose from the meat segments in which they are wholly or partially embedded.

The above mentioned patented devices while satisfactory in some instances have been found to leave an undesirable quantity of the seeds unloosened in other instances, and the subject invention is directed to diminishing the number of these unloosened seeds.

SUMMARY OF THE INVENTION

The seed separating apparatus of the present invention is adapted for use in conjunction with a commercial citrus fruit sectionizer such as shown in the aforementioned U.S. Pat. No. 3,072,160, and basically includes a set of stationary pinching fingers, which are inserted about the stem-blossom axis of the fruit so as to penetrate the fruit in a circular path in the region of the apex of each meat segment, and a set of oscillating pinching fingers interspaced between the stationary fingers which, accordingly, penetrate the fruit in the same region. The oscillating pinching fingers are oscillated in arcuate paths between the adjacent stationary fingers, thereby pinching between respective fingers seeds that are in the meat segments. The seeds are thus caused to pop out and be separated from the meat segments which have previously been freed from their encompassing membranes.

Accordingly it is an object of the present invention to provide an improved apparatus for separating seeds from the meat segments of citrus fruit.

Another object is to provide a seed separating apparatus wherein the seeds embedded in the citrus fruit sections are separated therefrom by a pinching action accomplished by sets of oscillating and stationary fingers which are inserted into the fruit in the region of the embedded seeds.

DESCRIPTION OF THE PREFERRED EMBODIMENT

The seed separating device 18 of the present invention is described in connection with a sectionizing machine 20 which is similar to the machine disclosed in U.S. Pat. No. 3,148,717 to B.N. Willis. A description of the components and operation of the Willis machine not completely described herein may be obtained by reference to that patent.

Figure 1:
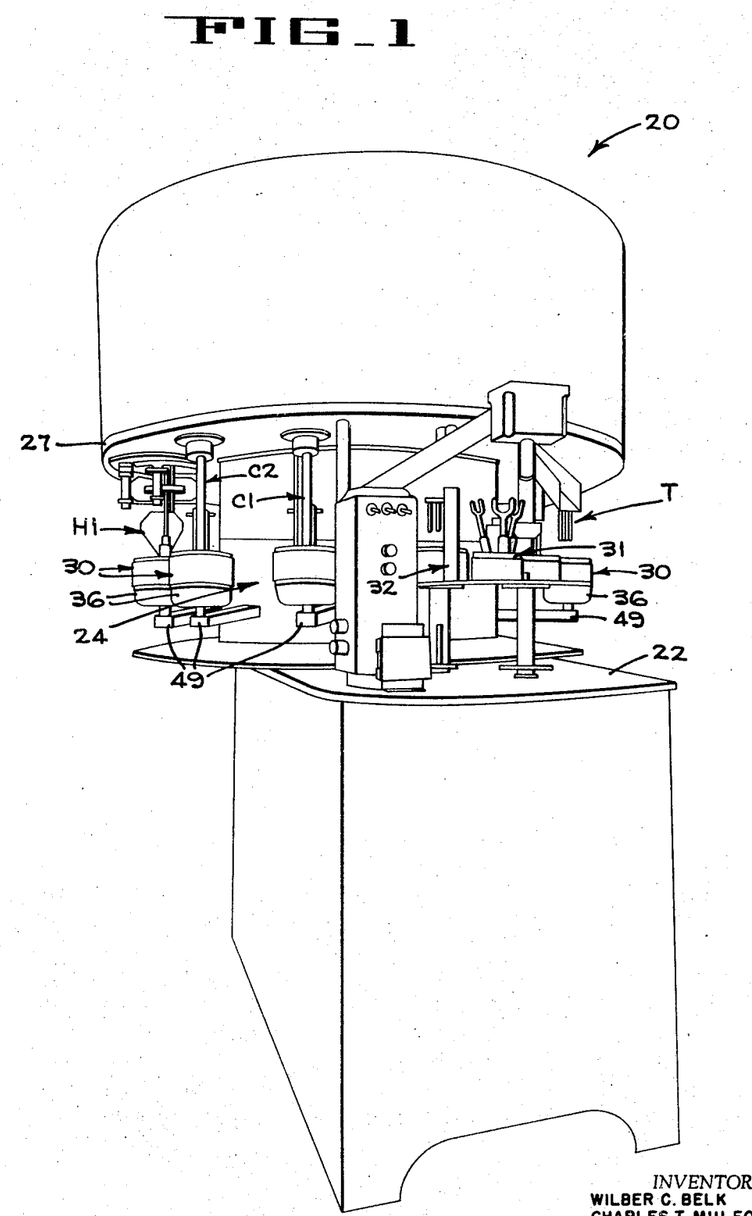
FIG. 1 is a diagrammatic perspective view taken looking at one end of a citrus fruit sectionizing machine in which the seed separating device of the present invention is incorporated.
Figure 2:
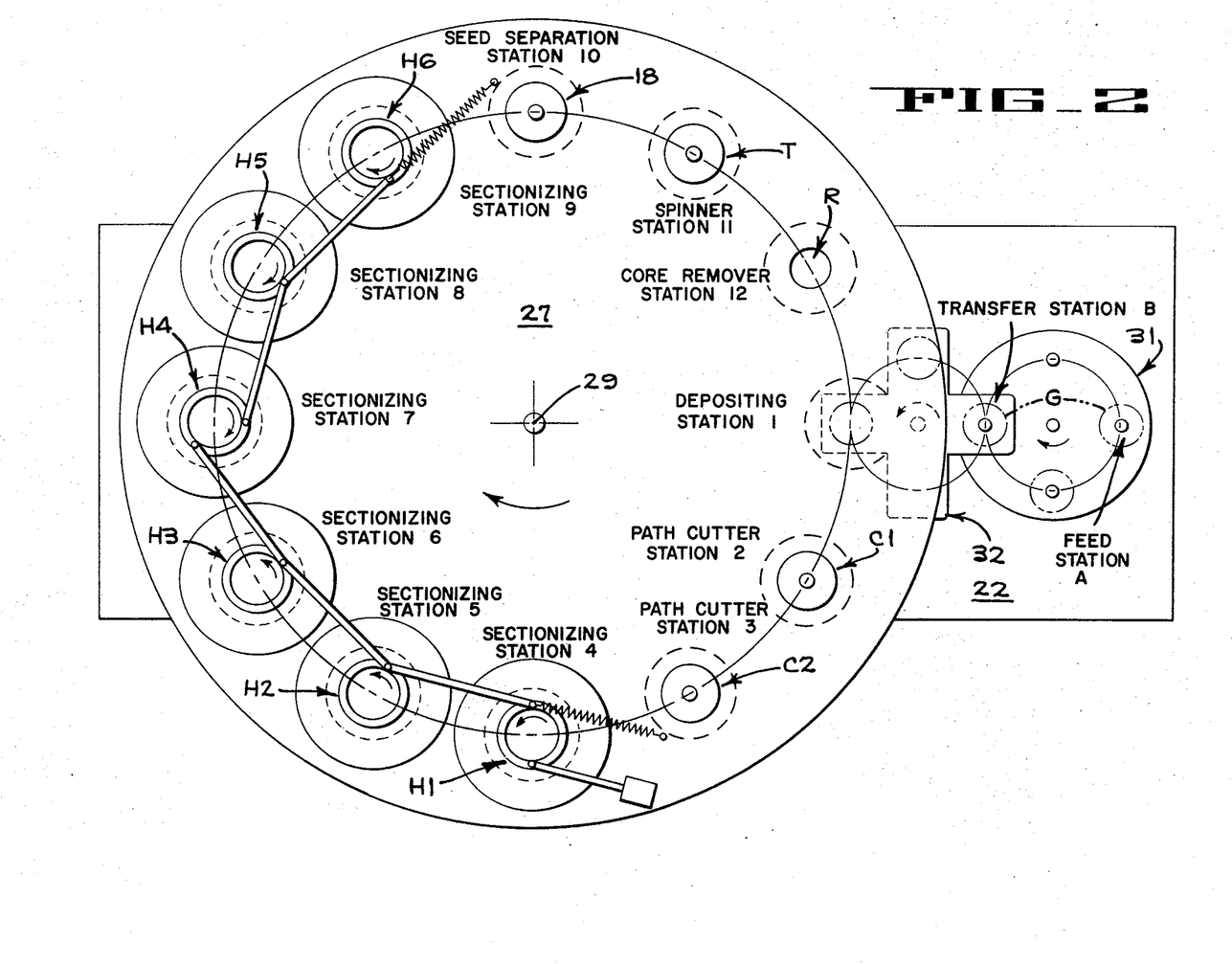
FIG. 2 is a schematic top plan view of the sectionizing machine of FIG. 1.

In general, the sectionizing machine 20 (FIG. 1) comprises a fixed base on which a table top 22 is mounted. Twelve fruit carriers 30 are mounted above the table top on a turret 24 that rotates about a vertical axis 29 (FIG. 2). A circular tool carrier 27 is mounted above the turret for vertical movement toward and away from the turret. When the tool carrier 27 is lowered and raised, it moves several fruit processing units mounted thereon into and out of engagement with fruit held in the twelve fruit carriers 30 which are mounted around the periphery of the turret at twelve equi-spaced stations designated as stations 1–12 in the plan view of FIG. 2. The fruit processing units include a first path cutter C1 at station 2, a second path cutter C2 at station 3, six sectionizing heads H1–H6 at stations 4–9 respectively, the seed separating device 18 of the present invention at station 10, a spinner T at station 11, and a core remover R at station 12. There is no fruit processing unit on the tool carrier 27 at station 1 since, at this station, the only operation that takes place is the depositing of a fruit in the carrier. Also mounted above the table top 22 is a fruit feed turret 31 and a transfer turret 32. A motor 40 (FIG. 3) is mounted on the upper surface of a tool carrier 27 and is operatively connected to a plurality of eccentric drive units 41a–41 for vertically reciprocating the blades of the sectionizing heads H1–H6 and the fingers of the cutting heads C1 and C2.

During operation of the machine 20, grapefruit G to be sectionized are advanced on a supply conveyor (not shown) to a point within reach of an operator who is positioned adjacent the feed turret 31. The operator places the grapefruit, one by one, on the feed turret at station A, said turret being arranged to be intermittently indexed through 90° annular movements in a clockwise direction (FIG. 2) to bring each grapefruit to a transfer station B where the fruit is automatically transferred from the feed turret to the transfer turret 32 which is also arranged to be intermittently indexed in 90 degree increments in synchronism with the movements of feed turret 31, but in a counterclockwise direction. The grapefruit is then moved to station 1 of the main turret where it is deposited in one of the fruit carriers 30. The main turret 24 is arranged to be intermittently indexed through 30° annular increments in a clockwise direction (FIG. 2) about axis 29 to move the grapefruit successively to the 12 stations of the machine.

The feed turret 31 and the transfer turret 32 are similar to the feed and transfer turrets of the sectionizing machine disclosed in the before-mentioned patent to H.W. Grotewold. Since these turrets do not form part of the present invention, they will not be described in detail, however, reference may be had to the above-identified Grotewold patent for a complete description of any mechanisms of the present machine that are not described herein in detail.

After a fruit has been processed by the path cutters C1 and C2 at stations 2 and 3, respectively, and has been acted on by the sectionizing blades of the six sectionizing heads at stations 4–9, it is moved to station 10. At this time a large portion of the pie-shaped sections of the fruit have been separated from the core and the membranes, but some connections remain. Also, a portion of the seeds have been loosened from the fruit and have dropped onto a discharge conveyor; however, some seeds still cling to the fruit sections. The seed separating device 18 of the present invention is particularly adapted to engage the fruit at this time and pinch the remaining seeds from the fruit sections.

Figure 8:
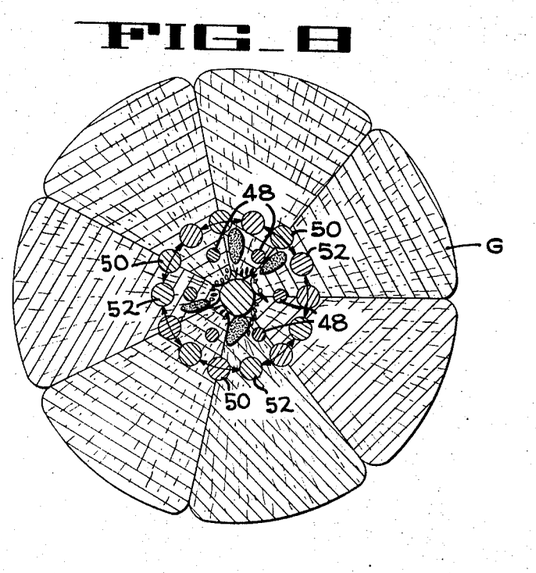
FIG. 8 is a horizontal diagrammatic section of a peeled grapefruit having the pinching fingers of the seed separating device inserted therein.
Figure 9:
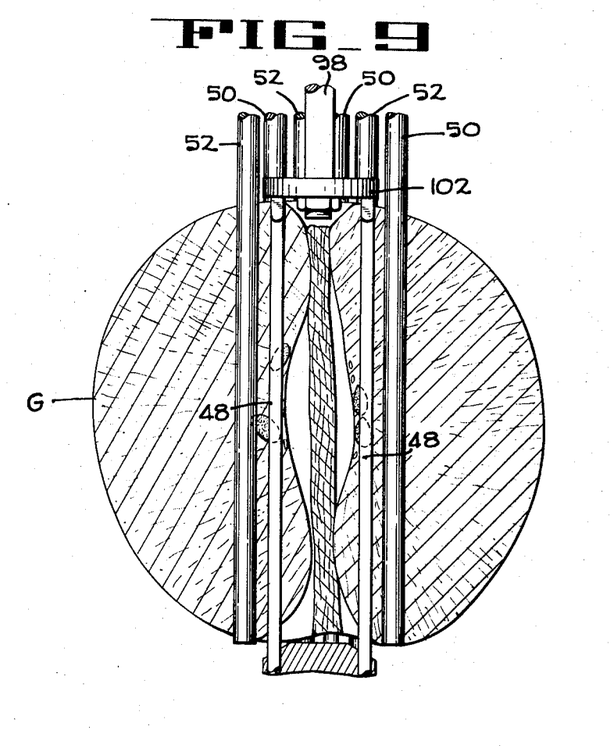
FIG. 9 is a vertical diagrammatic section of a peeled grapefruit having the pinching fingers of the seed separating device inserted therein.

The grapefruit G is retained in the carrier 30 by an inflatable fruit holder 36 (FIGS. 10 and 11) and by a plurality of upwardly extending needles 48 on an arm 49 of the main turret while the pinching fingers, comprising oscillating fingers 50 and stationary fingers 52, are inserted down into the fruit adjacent the apex of the sections as best seen in FIGS. 8 and 9. The physical characteristics of the fingers are very important in that they must be resilient so as not to sever the meat segments when oscillating therein, yet must be stiff enough to pinch seeds with effective force. A material which has been found to satisfy the above requirements is 17–7PH Stainless Steel which is characterized by a relatively high yield point.

Figure 5:
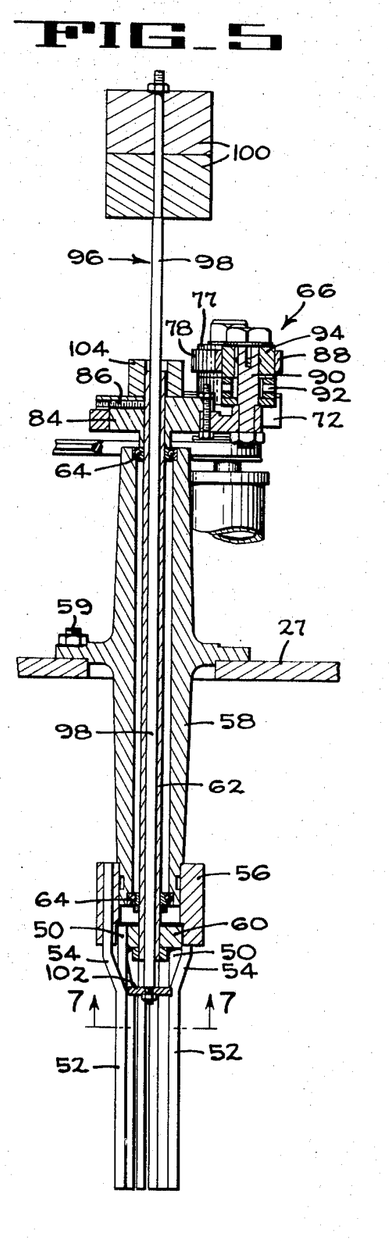
FIG. 5 is a vertical section of the seed separating device taken along line 5—5 of FIG. 4.
Figure 7:
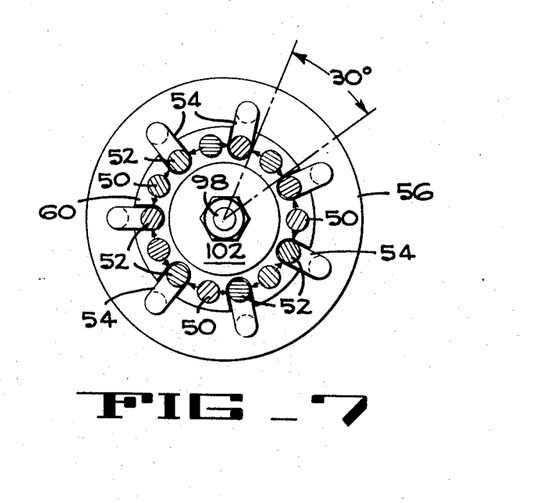
FIG. 7 is a horizontal section taken along line 7—7 of FIG. 5.

The lower portions of all of the pinching fingers 50 and 52 (FIGS. 7 and 8) are disposed in a circular array, with the stationary fingers 52 interspaced between adjacent oscillating fingers 50. However, each stationary finger 52 is provided with a goose neck at 54 (FIG. 5) so that the upper ends of the fingers are displaced radially outwardly from the upper ends of the oscillating fingers and are rigidly fixed in a collar 56 that is secured to a generally cylindrical housing 58 of the seed separating device. Housing 58 is secured to the tool carrier 27 by bolts 59. The oscillating fingers 50 have their upper ends rigidly fixed in a collar 60 that is secured to the lower end of a rotatably mounted tube 62 disposed axially through the housing 58. The tube 62 is mounted in two ball bearings 64 whose inner races are press-fitted around the tubing. The outer races of the bearings 64 are embedded in the housing 58. Thus it is apparent that the oscillating fingers 50 are free to arcuately oscillate within the physical limits imposed thereon by the adjacent stationary fingers 52, but in fact, the oscillating fingers do not contact the stationary fingers in operation of the separating device as will be explained more clearly hereinafter.

Figure 3:
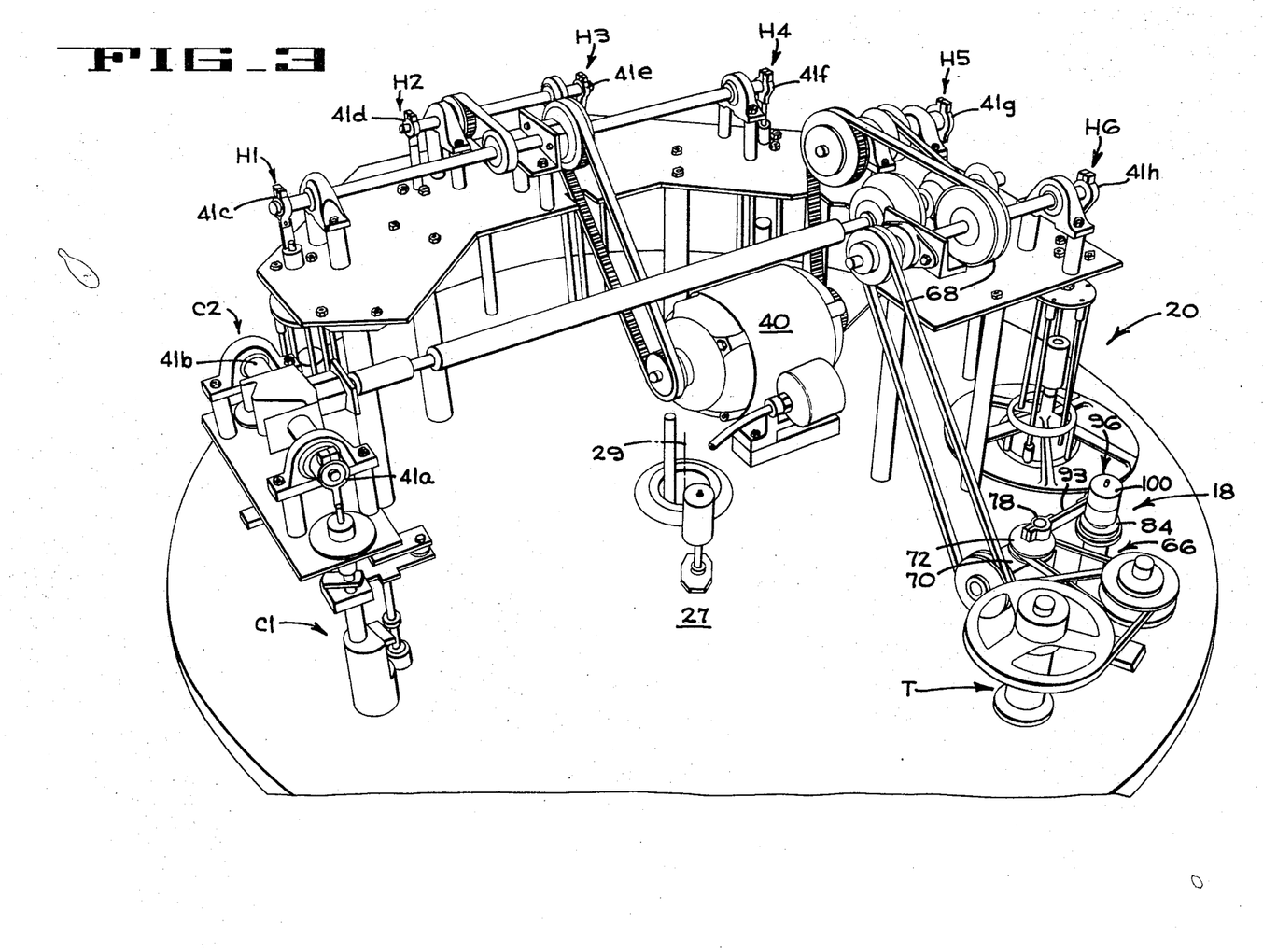
FIG. 3 is a fragmentary diagrammatic perspective looking downwardly at the drive mechanism on the top of the machine of FIG. 1.
Figure 4:
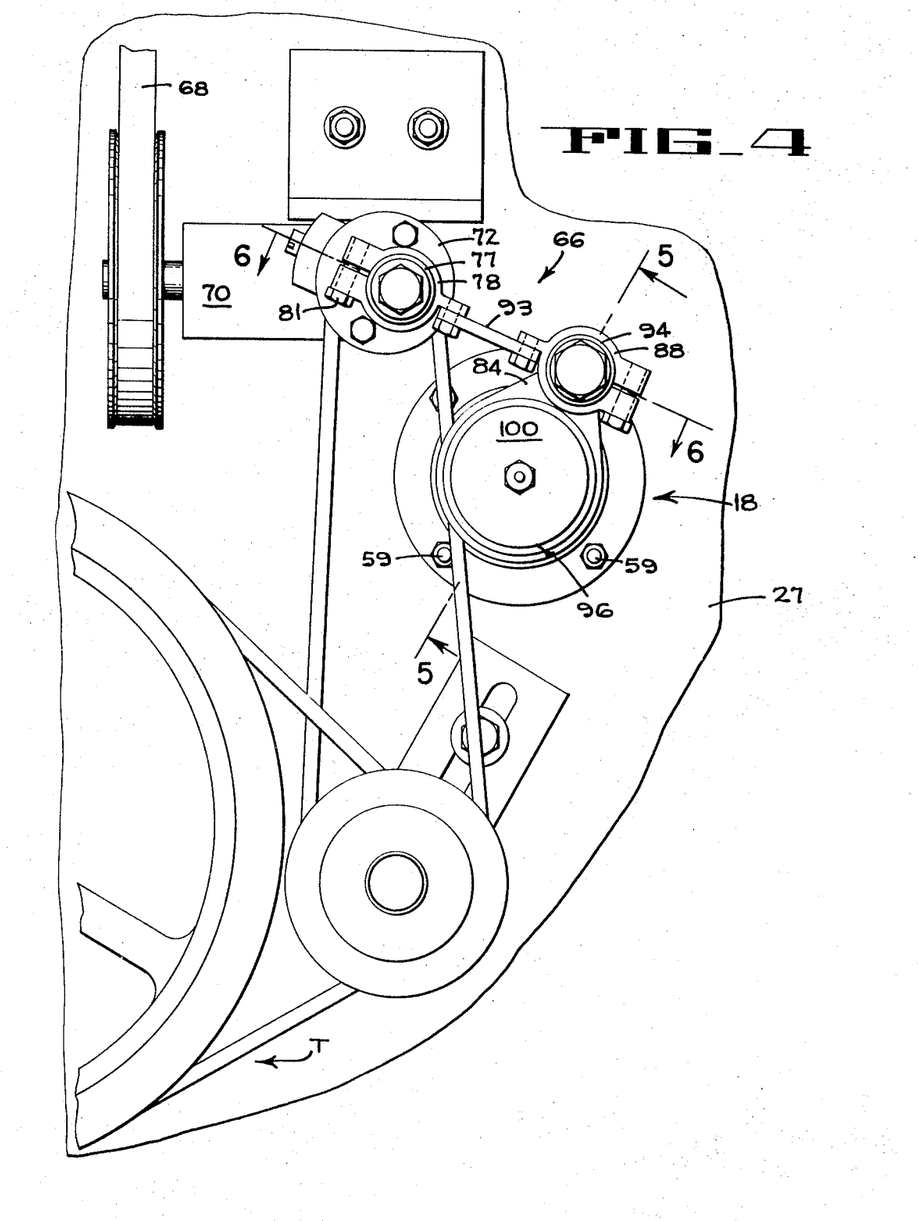
FIG. 4 is an enlarged fragmentary diagrammatic plan view of a portion of the drive mechanism shown in FIG. 3 particularly showing the drive for the seed seperating device.
Figure 6:
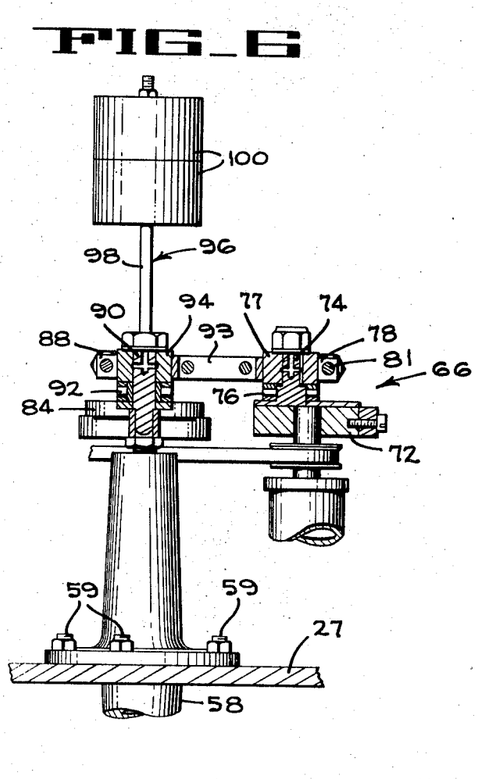
FIG. 6 is a fragmentary vertical section of the seed separating device taken along line 6—6 of FIG. 4.

The oscillatory movement of the fingers 50 is produced by a drive mechanism 66 (FIGS. 3 and 4) which oscillates the fingers at about 1,150 cycles/min. In FIG. 3 it can be seen that the drive mechanism 66 is powered by the motor 40 through a belt and pulley drive assembly 68 and a gear box 70. Fixed to a vertical output shaft of the gear box 70 is a crank plate 72 (FIGS. 4 and 6) having an upstanding nub 74 with a roller bearing 76 disposed therearound. A bushing 77 is rotatably mounted upon the nub above the roller bearing 76 to provide a cylindrical surface about which a clamp 78 can be secured as by a bolt 81.

The oscillating finger supporting tube 62 (FIG. 5) is set in a drive late 84 by a set screw 86. The drive plate 84 is similar to the crank plate 72 in that it has a clamp 88 rotatably mounted thereon by means of an offset nub 90, a roller bearing 92, and a bushing 94. However, the throw of the drive plate 84 is greater than the throw of the crank plate 72, so that when the clamps 78 and 88 of the crank plate and the drive plate respectively, are linked by a connecting rod 93, the rotative movement of crank plate 72 will cause oscillatory movement of the drive plate 84 and consequently, the fingers 50 operatively connected therewith.

The throws of the crank plate and drive plate are related such that the fingers 50 are caused to oscillate (FIG. 7) so as to closely approach but not contact the adjacent stationary fingers 52 whose nearest sides are angularly displaced approximately 30°. The oscillatory movement of the fingers 50 toward and away from adjacent stationary fingers 52 will cause any seed in the adjacent vicinity to be pinched between the respective fingers and dislodged.

Inasmuch as grapefruit in excess of four inches in diameter are not processed in the sectionizing machine described herein, the radius of the circle of fingers 50 and 52 has been set so as to define an area greater than the area in which seeds will be found, so that, the seeds will always be pinched inwardly toward the core of the grapefruit and will never be pinched further into the meat segments. Those seeds that are not actually pinched by the fingers 50 and 52 will be shaken loose from the meat due to the high frequency with which the fingers 50 are oscillated.

As stated hereinbefore, the fruit is retained in the carrier 30 by an inflatable fruit holder 36 and a plurality of upwardly extending needles 48. These retaining means prevent the meat segments from moving with the pinched seeds.

Figures 10, 11:
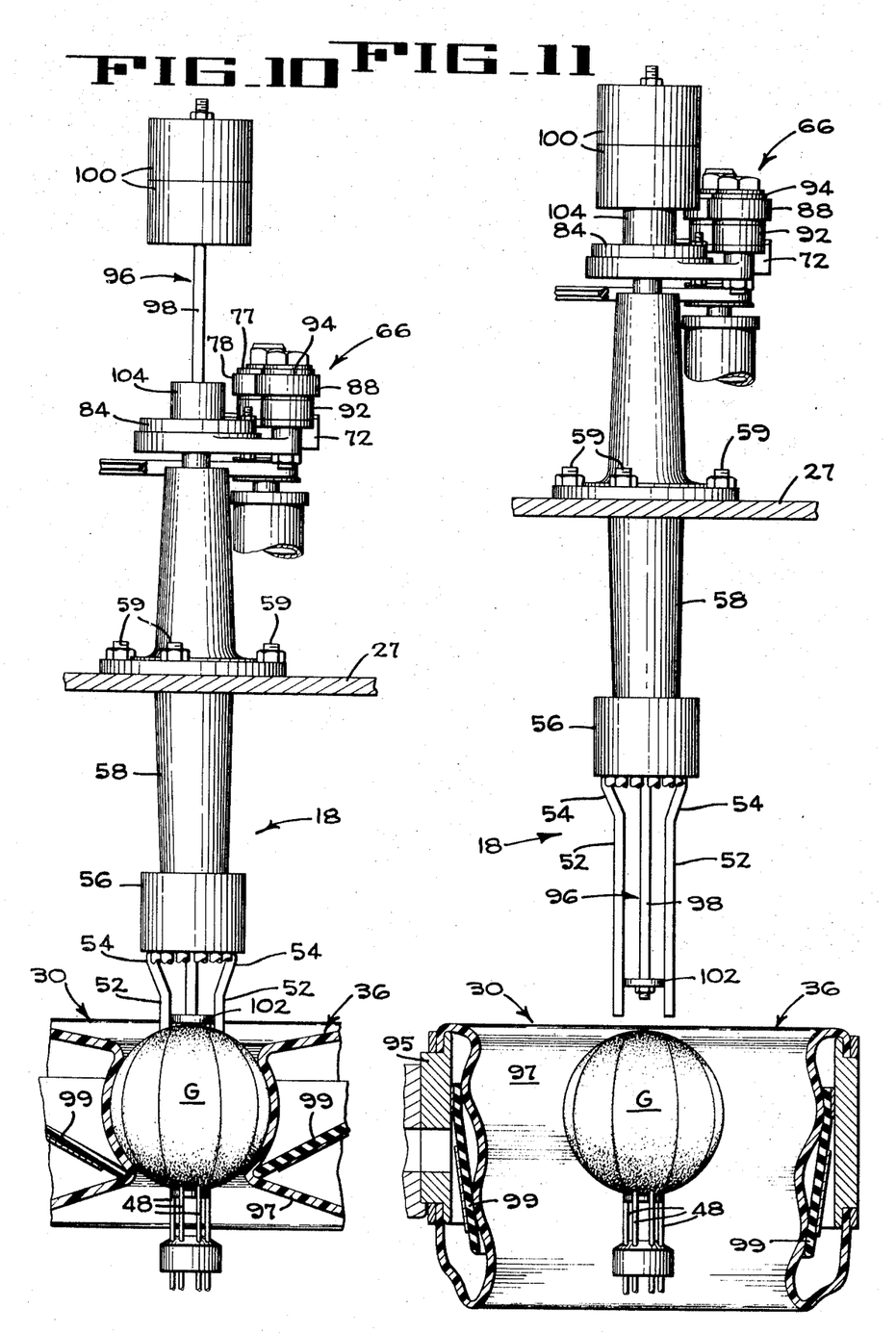
FIGS. 10 and 11 are operational views of the seed separator illustrating the vertical movement of the pinching fingers into and out of the grapefruit.

The inflatable fruit holder 36, shown inflated in FIG. 10 and deflated in FIG. 11, is disposed around each set of fingers 50 and 52 for gripping the fruit during several of the operations of the sectionizing machine including the seed separating operation at station 10. Each holder includes a rigid ring 95 which supports an internally disposed tubular fruit gripper member 97 which is made of thin pliable sheet material. The tubular gripper is hermetically sealed to the ring 95 and is connected to a regulatable pressurized air supply (not shown) for inflation and deflation as desired. A plurality of spaced hold-down fingers 99 are mounted in the tubular gripper 97 to prevent the lower end of the tubular gripper from moving upwardly in the space between the ring 95 and the fruit while the gripper is being inflated. It is readily apparent that as air is pumped into the gripper and the gripper inflates, the gripper will very securely hold the fruit together. For a more detailed description of the fruit holder, reference may be had to the aforementioned U.S. Pat. No. 3,148,717 to B.N. Willis.

When the fingers are withdrawn vertically from the grapefruit, the meat segments core and membranes of the grapefruit have a tendency to be frictionally lifted upwardly because as the fingers 50 and 52 are being withdrawn, the gripper 97 is automatically deflated in a manner described fully in U.S. Pat. No. 3,148,717. To prevent the grapefruit from being lifted upwardly with the fingers 50 and 52 upon withdrawal of the fingers, a stripper 96, best seen in FIGS. 10 and 11, is utilized. The stripper comprises an elongated rod 98 which has weights 100 supported on its upper end and an abutment head 102 secured to its lower end. The rod 98 extends slidably through the center of the finger supporting tube 62 so that the stripper can hold the grapefruit down when the tool carrier 27 is raised drawing the fingers 50 and 52 out of the grapefruit. In FIG. 10 the seed separator 18 and stripper 96 are seen lowered in the operative position of the separator.

During the majority of the upward movement of the tool carrier 27, the abutment head of the stripper remains against the top of the fruit and holds it down due to the weights 100 on the top of the stripper. When the tool carrier is elevated a distance such that the fingers are substantially free of the fruit, the bottom of the weights engage a hub 104 on the top of drive plate 84 causing the stripper to be elevated with the tool carrier until the tool carrier, seed separator, and stripper reach their uppermost position (FIG. 11).

In operation, when a grapefruit G, held in the main turret, has been indexed to station 10 of the sectionizing machine 20, the tool carrier 27 is lowered forcing fingers 50 and 52 into the grapefruit so that they surround the core and any seeds within the grapefruit. The abutment head 102 of the stripper engages the top of the needles 48 as the tool carrier is lowered so that the entire weight of the stripper rests on the needles 48 adjacent the top of the grapefruit. When the fingers have completely penetrated the grapefruit but before they contact the underlying fruit supporting arm 49 (FIG. 1) of the main turret, the downward movement of the tool carrier is stopped. The oscillating fingers 50 are continuously in motion so that when they are inserted into the fruit they will pinch any seeds lying in the immediate vicinity into the central core area of the fruit wherefrom some will fall onto a removal conveyor belt (not shown) disposed below, and others will be loosened but remain with the meat segments. The seeds which are not physically contacted by any of the fingers are shaken loose by the oscillating fingers. The tool carrier is then elevated causing the gripper 97 to be deflated (by means disclosed in the aforementioned U.S. Pat. No. 3,148,717) and enabling the fingers, which are still oscillating to free loosened seeds remaining with the meat segments and to jar loose the meat segments that have already been separated from their membranes but have been held together by the adhesion of the segments to each other. As stated hereinbefore, the stripper holds the grapefruit down while the fingers are being withdrawn.

After the fingers have been completely withdrawn from the fruit and the abutment head is raised from the top of the grapefruit, the fruit is moved to stations 11 and 12 where the spinner T and core remover R strip the remaining meat segments from the membranes, and remove the core and membranes respectively as disclosed in the above mentioned U.S. Pat. No. 3,148,717.

Although the best mode contemplated for carrying out the present invention has been herein shown and described, it will be apparent that modification and variation may be made without departing from what is regarded to be the subject matter of the invention.

We claim:

1. In an apparatus for processing peeled seed bearing citrus fruit, a seed separator comprising a plurality of stationary fingers and a plurality of adjacent movable fingers, means for inserting said stationary and movable fingers into said fruit in the region of the seeds therein, and means for oscillating said movable fingers relative to the stationary fingers so as to pinch the seeds between said stationary and movable fingers and thereby loosen the seeds from the fruit segments in which they are embedded.

2. The apparatus of claim 1 wherein said stationary and oscillatory fingers are each disposed in a circular array.

3. The apparatus of claim 2 wherein the circular array of stationary fingers is concentric with and of the same radius as the circular array of oscillatory fingers and wherein the oscillatory fingers are interspaced between adjacent stationary fingers.

4. The apparatus of claim 3 wherein the nearest sides of adjacent stationary fingers are angularly displaced approximately 30°.

5. The apparatus of claim 3 wherein the degree of movement of the oscillatory fingers is such that they do not contact the adjacent stationary fingers but come close enough thereto to dislodge a seed disposed therebetween.

6. The apparatus of claim 3 wherein said fingers are formed of stainless steel.

7. An apparatus for processing peeled seed bearing citrus fruit comprising in combination means for holding the fruit during processing operations, a reciprocally mounted tool carrier; a plurality of seed loosening fingers operatively connected to said tool carrier so as to be forced into the fruit upon the movement of the tool carrier in one direction and withdrawn from the fruit upon movement of the tool carrier in the opposite direction, and means for oscillating a portion of said fingers while the remainder of the fingers are held stationary so that seeds in the immediate vicinity of the fingers will be pinched between the oscillatory and stationary fingers and thereby loosened and dislodged from the fruit.

8. The apparatus of claim 7 wherein said tool carrier is reciprocable in a vertical direction and wherein said fingers are inserted into the fruit on the downward movement of the tool carrier.

9. The apparatus of claim 8 further including stripper means for holding the fruit as the said fingers are withdrawn from the fruit so as to prevent the fruit from being frictionally moved by the fingers.

10. The apparatus of claim 8 wherein said stripper means comprises a weighted abutment head which holds the fruit down by gravitational force on the upward movement of the fingers.

11. The apparatus of claim 7 wherein said means for holding the fruit comprises a circumferential gripper which holds the fruit together during the seed loosening operation.

12. The apparatus of claim 7 wherein said fingers are disposed in a circular array with the oscillatory fingers being arcuately interspaced between the stationary fingers.

13. The apparatus of claim 7 wherein said fingers are formed of stainless steel.

14. An apparatus for processing peeled seed bearing citrus fruit comprising in combination a circumferential gripper for holding the fruit during the processing operations, a vertically reciprocal tool carrier disposed above said gripper, a circular array of oscillatory seed pinching fingers, a circular array of stationary seed pinching fingers concentric with and of the same radius as said circular array of oscillatory seed pinching fingers and being interspaced between said oscillatory fingers, each of said circular array of fingers being mounted on said tool carrier for vertical reciprocal movement therewith so as to be inserted into and withdrawn out of the fruit upon each reciprocal movement thereof, means for oscillating said oscillatory fingers in the fruit so that seeds in the immediate vicinity of the fingers will be pinched between respective stationary and oscillatory fingers to thereby loosen and dislodge the seeds from the fruit, and a stripper for holding the fruit down as the pinching fingers are raised out of the fruit.

* * * * *